(12) United States Patent
Heremans et al.

(10) Patent No.: US 12,275,542 B2
(45) Date of Patent: Apr. 15, 2025

(54) FOLDABLE AND REMOVABLE PROTECTIVE CAGE

(71) Applicant: Flybotix SA, Renens (CH)

(72) Inventors: François Heremans, Les Plans-sur-Bex (CH); Samir Bouabdallah, Yverdon les Bains (CH)

(73) Assignee: Flybotix SA, Renens (CH)

( * ) Notice: Subject to any disclaimer, the term of this patent is extended or adjusted under 35 U.S.C. 154(b) by 132 days.

(21) Appl. No.: 18/011,748

(22) PCT Filed: Jun. 16, 2021

(86) PCT No.: PCT/IB2021/055313
§ 371 (c)(1),
(2) Date: Dec. 20, 2022

(87) PCT Pub. No.: WO2021/260497
PCT Pub. Date: Dec. 30, 2021

(65) Prior Publication Data
US 2023/0227184 A1    Jul. 20, 2023

(30) Foreign Application Priority Data
Jun. 23, 2020  (CH) ................................ CH00759/20

(51) Int. Cl.
*B64U 30/299* (2023.01)
*B64U 30/293* (2023.01)
*B64U 10/10* (2023.01)

(52) U.S. Cl.
CPC ......... *B64U 30/299* (2023.01); *B64U 30/293* (2023.01); *B64U 10/10* (2023.01)

(58) Field of Classification Search
CPC ......... B64C 27/006; B64C 1/062; B64C 1/08; B64U 30/299
See application file for complete search history.

(56) References Cited

U.S. PATENT DOCUMENTS 5,797,815 A * 8/1998 Goldman ............... A63H 33/18
                                                          473/588
6,237,538 B1 * 5/2001 Tsengas ............... A01K 5/0114
                                                          119/710

(Continued)

FOREIGN PATENT DOCUMENTS

| CN | 110194259 A | * | 9/2019 | ............. B64C 1/063 |
| CN | 112278233 A | * | 1/2021 | ............... B64C 1/08 |
| WO | WO-2020/002918 A1 | | 1/2020 | |

OTHER PUBLICATIONS

International Search Report & Written Opinion for PCT/IB2021/055313, dated Aug. 23, 2021, 16 pages.

*Primary Examiner* — Nicholas McFall
*Assistant Examiner* — Terri L Filosi
(74) *Attorney, Agent, or Firm* — BLANK ROME LLP

(57) ABSTRACT

The present invention relates to a protective foldable cage (100) adapted to flying drones. It comprises several ribs linked at their extremities by a ring and comprising on their length several connection points allowing strings to join each of the adjacent ribs. The length of the string corresponds to the maximal angular shift between the first and the last ribs. The protective cage further comprises easily removable locking means adapted to maintain the ribs at predetermined relative angular position once deployed. The present invention further relates to a system comprising such a protective cage and a drone support, as well as a method of protection of flying drones.

15 Claims, 8 Drawing Sheets

(56) References Cited

U.S. PATENT DOCUMENTS

Figure 1A:
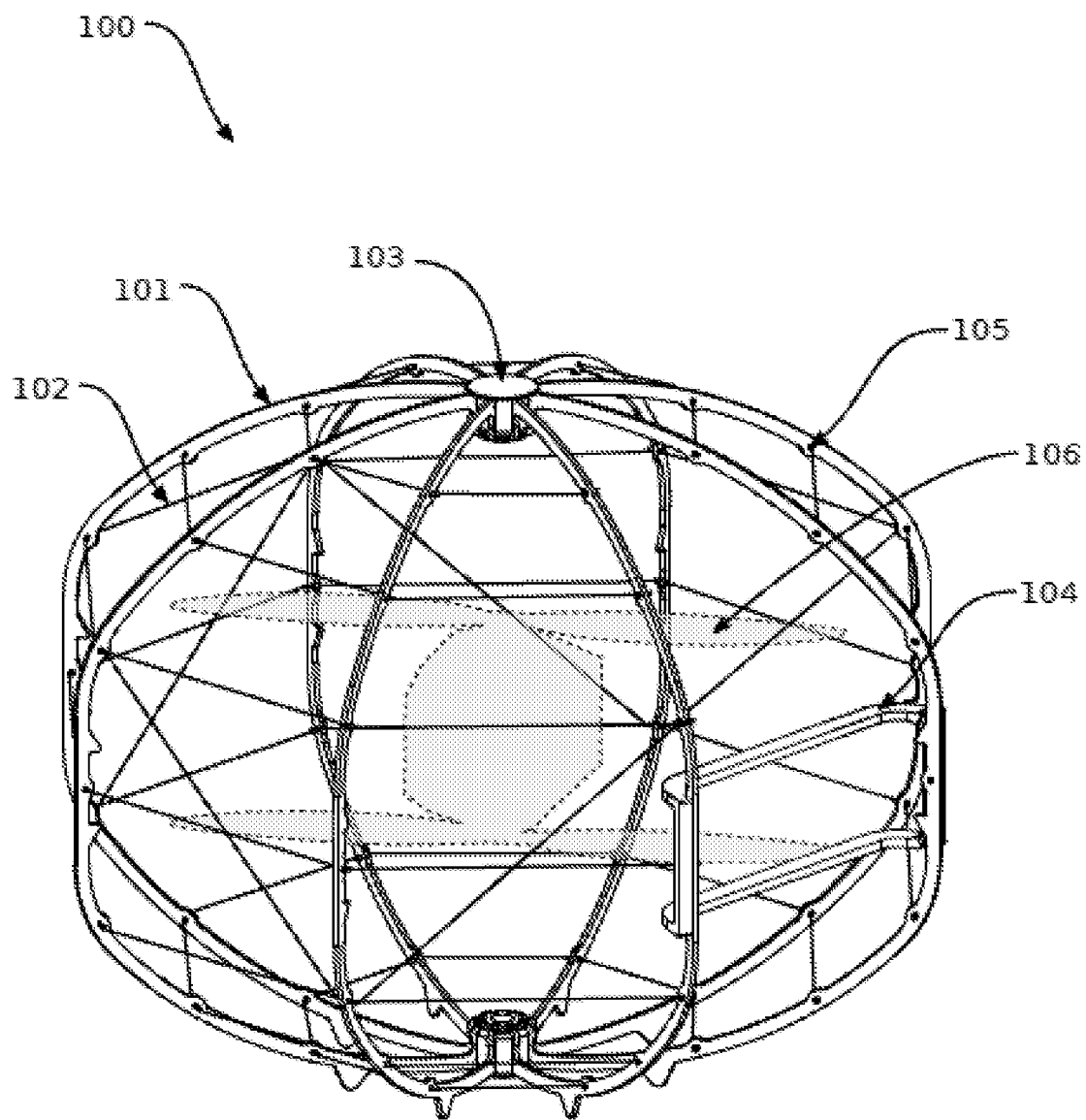

| | | | | |
|---|---|---|---|---|
| 6,805,077 | B2* | 10/2004 | Goldman | A01K 15/025 |
| | | | | 119/707 |
| 7,273,195 | B1* | 9/2007 | Golliher | A63H 27/12 |
| | | | | 244/17.11 |
| 10,112,121 | B2* | 10/2018 | Tiefel | A63H 33/003 |
| 10,300,346 | B2* | 5/2019 | Hinnen, III | A63B 39/00 |
| 2017/0210468 | A1 | 7/2017 | Jacob et al. | |
| 2017/0291697 | A1 | 10/2017 | Kornatowski et al. | |
| 2018/0155018 | A1 | 6/2018 | Kovac et al. | |
| 2019/0100296 | A1* | 4/2019 | Aldana L?pez | B64U 10/70 |

* cited by examiner

FOLDABLE AND REMOVABLE PROTECTIVE CAGE

RELATED APPLICATIONS

The present application is a national phase application of International Application No. PCT/IB2021/055313, filed on Jun. 16, 2021, which claims the benefit of Swiss Application No. CH 00759/20, filed Jun. 23, 2020. The contents of these applications are incorporated by reference in their entireties.

TECHNICAL DOMAIN

The present invention concerns a protective cage for an unmanned aerial vehicle (UAV). More particularly, it relates to a foldable cage, which can be easily dissociated from the unnamed aerial vehicle.

RELATED ART

Flying drones having helices or rotors present risks of injury of surrounding persons and risks of damage in case of collisions with obstacles. In particular, flying drones which are used to inspect cluttered and confined spaces. In addition, such flying drones progress in industrial environments often hindered with machines and equipment. These obstacles cannot always be detected and escaped before a contact. Obstacles such as buildings and any other urban constructions also represent risks of collisions. Such collisions may damage the flying drones, or parts of the flying drones, in particular their rotors. It is thus usual to protect the flying drones against chocs.

For protecting both the flying drones and the surrounding users and equipment, protective cages are usually arranged around the flying drones. The document US2017291697, for example, describes a protective cage for such a flying drone. The cage and the flying drone form together an ensemble that can be folded and unfolded. Folding and unfolding the cage and the drone necessitate several steps to secure the ensemble. Also, when the cage is damaged after a choc for example, it needs to be dissociated from the corresponding drone to be repaired, which necessitates time and additional manipulations. Furthermore, the cage is specifically designed for a given flying drone and cannot easily be adapted to other flying drones. A protective cage represents an additional weight for the flying drone, which impacts its energy consumption and its agility. It is thus a continuous challenge to provide light protective cages, which however provides sufficient protection while being cost effective, easy to manufacture and to maintain.

There is thus room to improve the protective cages for the flying drones.

SHORT DISCLOSURE OF THE INVENTION

An aim of the present invention is the provision of a protective cage, adapted for a flying drone, which overcomes the shortcomings and limitations of the state of the art. It is in particular an objective to provide an improved cage which is light and still efficient against chocs and injuries. It is also an aim to provide a protective cage which can easily be separated from the drone and/or adapted to various drones. To this extend, it is aimed at providing a protective cage which is foldable, independently from the drone it protects.

Another aim of the invention is the provision of a method of protection of a flying drone against collisions and to prevent user's and drone damages.

According to the invention, these aims are attained by the object of the attached independent claims and detailed in the dependant claims.

In particular, the protective cage 100 of the present disclosure is adapted for an Unmanned Aerial Vehicle (UAV) (i.e. a drone). This cage protects the rotors and other elements of the vehicle from physical damage resulting from collisions and/or falls. The cage structure allows a safer interaction between the vehicle and the surrounding environment. The cage should therefore be materially dense enough to offer protection while not impeding the vehicle's aerodynamics. Also, it must be able to deal with impacts, decelerating the body without inferring damage. Finally, in order to reduce the vehicle flight energy expenditure, the weight of the cage must be kept at a minimum. The cage needs also to be cost effective and easy to maintain.

The protective cage of the present disclosure is detachable from the vehicle, so that it can be replaced in case of heavy damage. Moreover, it is foldable or can be flattened so that its storage volume is significantly reduced compared to its deployed volume. This also facilitates the transport of spare cages, e.g. when operating in remote harsh environments.

The protective cage of the present disclosure can be substantially folded or flattened. The cage offers protection to the rotors and other vehicle elements located inside the cage volume. The structure itself is made of repeating thin ribs connected by a rope mesh, thus creating a strong yet lightweight structure. The ribs are connected at both poles by a ring and an indexing cap, hence forming a cage when unfolded. Whereas the ring prevents the ribs from moving radially, the indexing cap locates the ribs at specific angles. A closing part connects the two end ribs together, thus forming a closed cage. When the cage is in the deployed position, the ropes prevent the ribs from deforming, or limit their deformation, and act as energy absorbers to handle collisions.

The deployment of the cage from its storage position up to the fully opened position includes rotating the ribs around their retaining pole rings. Then the closing part and caps are installed. The rope mesh stays at all times fixed to the ribs.

To guarantee a mechanical stiffness of the structure, relative motion of the rope mesh with respect to the ribs is to be prevented. This is achieved by clamping the rope at least at some nodes, i.e. where the rope crosses a rib. Moreover, the rope mesh forms a criss-cross pattern to improve the mechanical response.

Lateral rods might be added to reinforce the tension of the rope and enhance collision resilience property. Such rods are optional and might be removable if not necessary. They can be inserted between adjacent ribs and thus maintain the distance between two adjacent ribs, including during a collision.

With respect to what is known in the art, the invention provides the advantage of a light and modular protection cage, easy to handle and adaptable to several different situations.

SHORT DESCRIPTION OF THE DRAWINGS

Exemplar embodiments of the invention are disclosed in the description and illustrated by the following drawings:

FIG. 1A: schematical 3D representation of the protective cage according to the present disclosure.

Figure 1B:
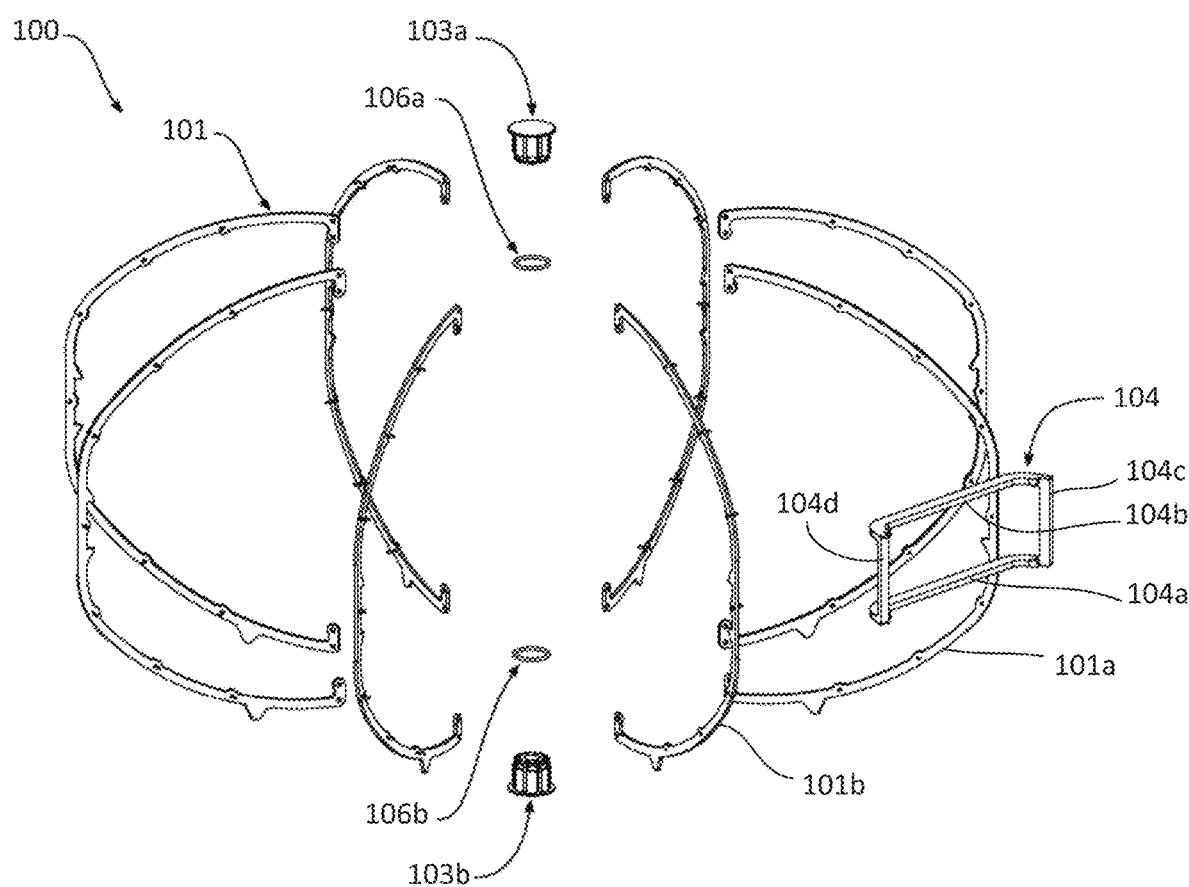

FIG. 1B: exploded view of the protective cage according to the present disclosure, showing the ribs and indexing caps, without the rope mesh.

Figure 1C:
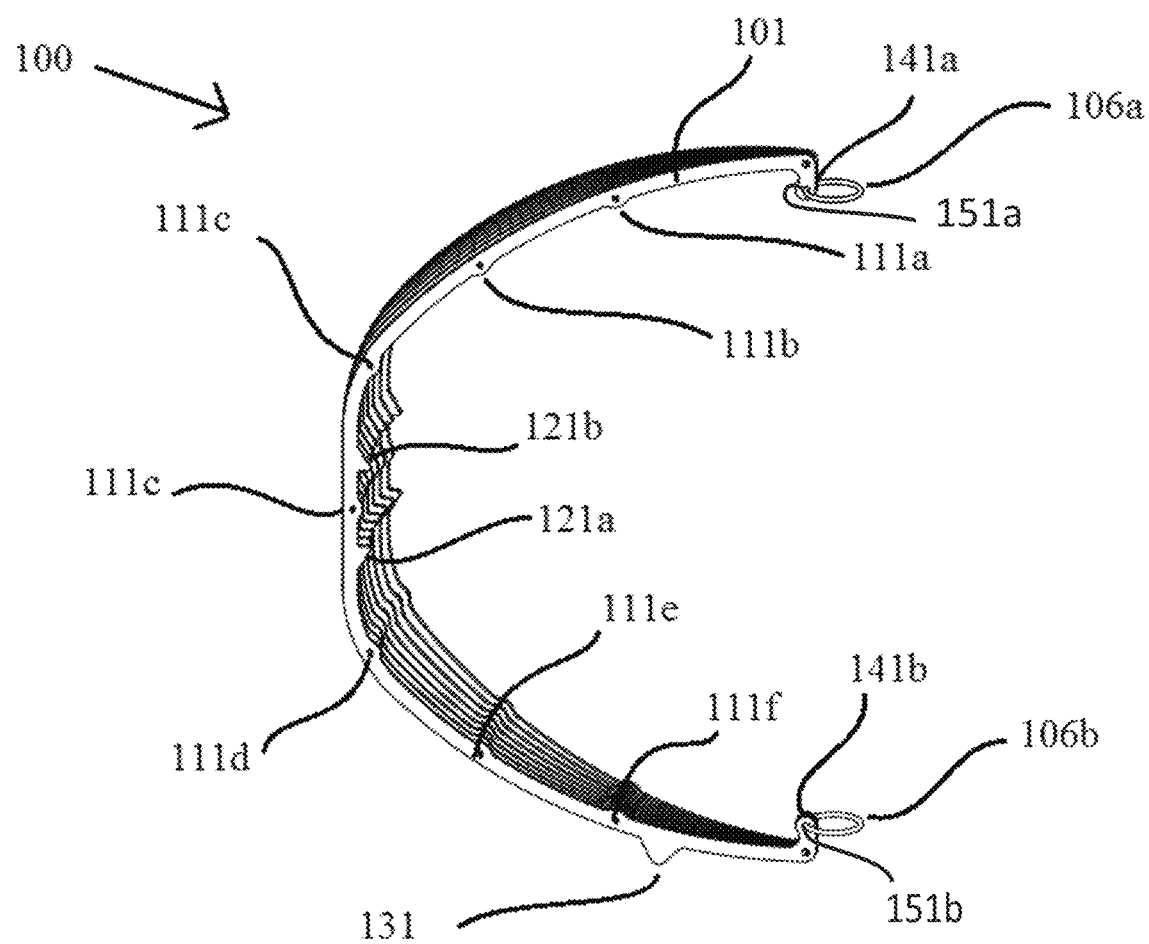
Figure 2C:
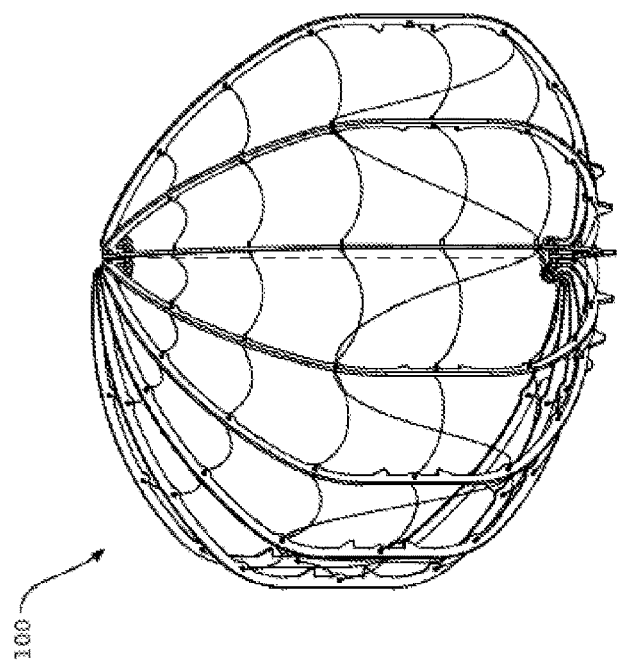
Figure 2B:
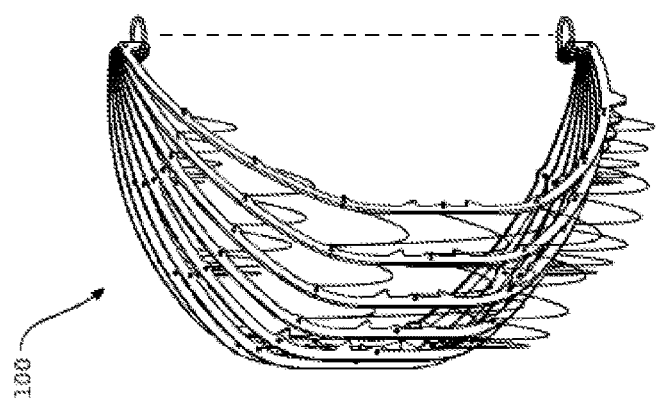
Figure 2A:
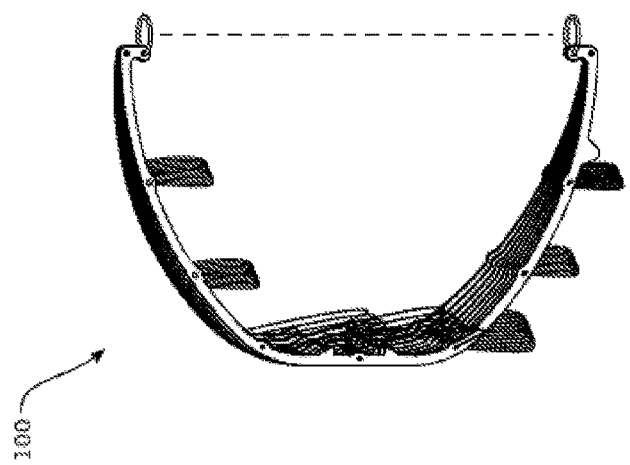
Figure 2D:
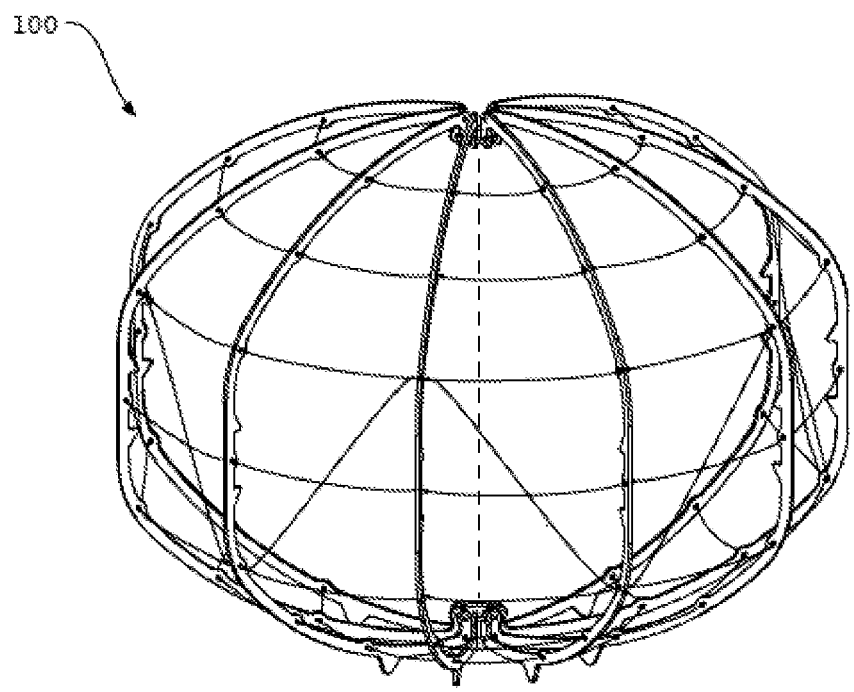
Figure 2E:
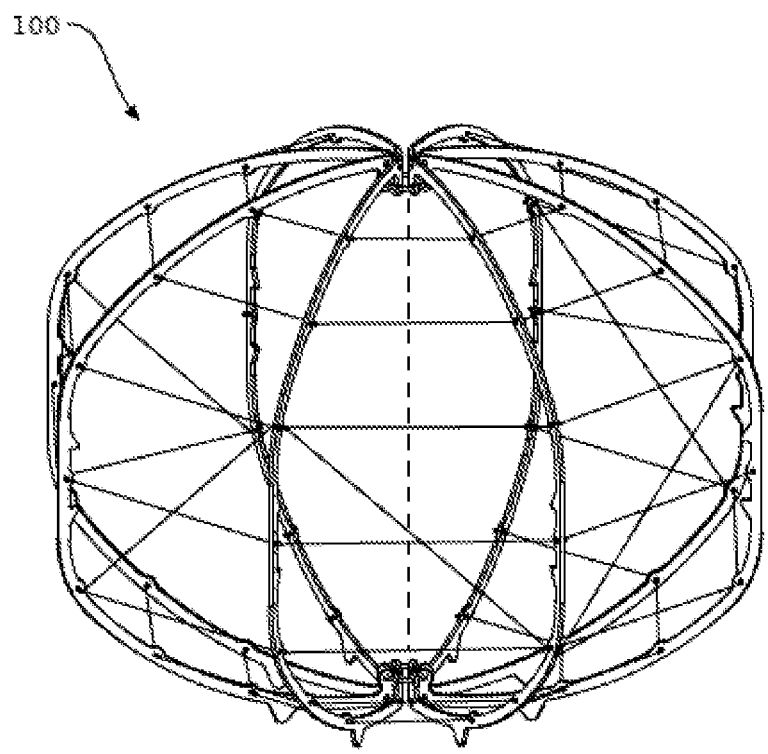

FIG. 1C: schematical representation of the ribs in the compact folded position, without strings.

FIGS. 2A, 2B, 2C, 2D, 2E: schematical representation of the protective cage according to the present disclosure at different folding stages, from the fully folded stage to the fully deployed stage.

Figure 3A:
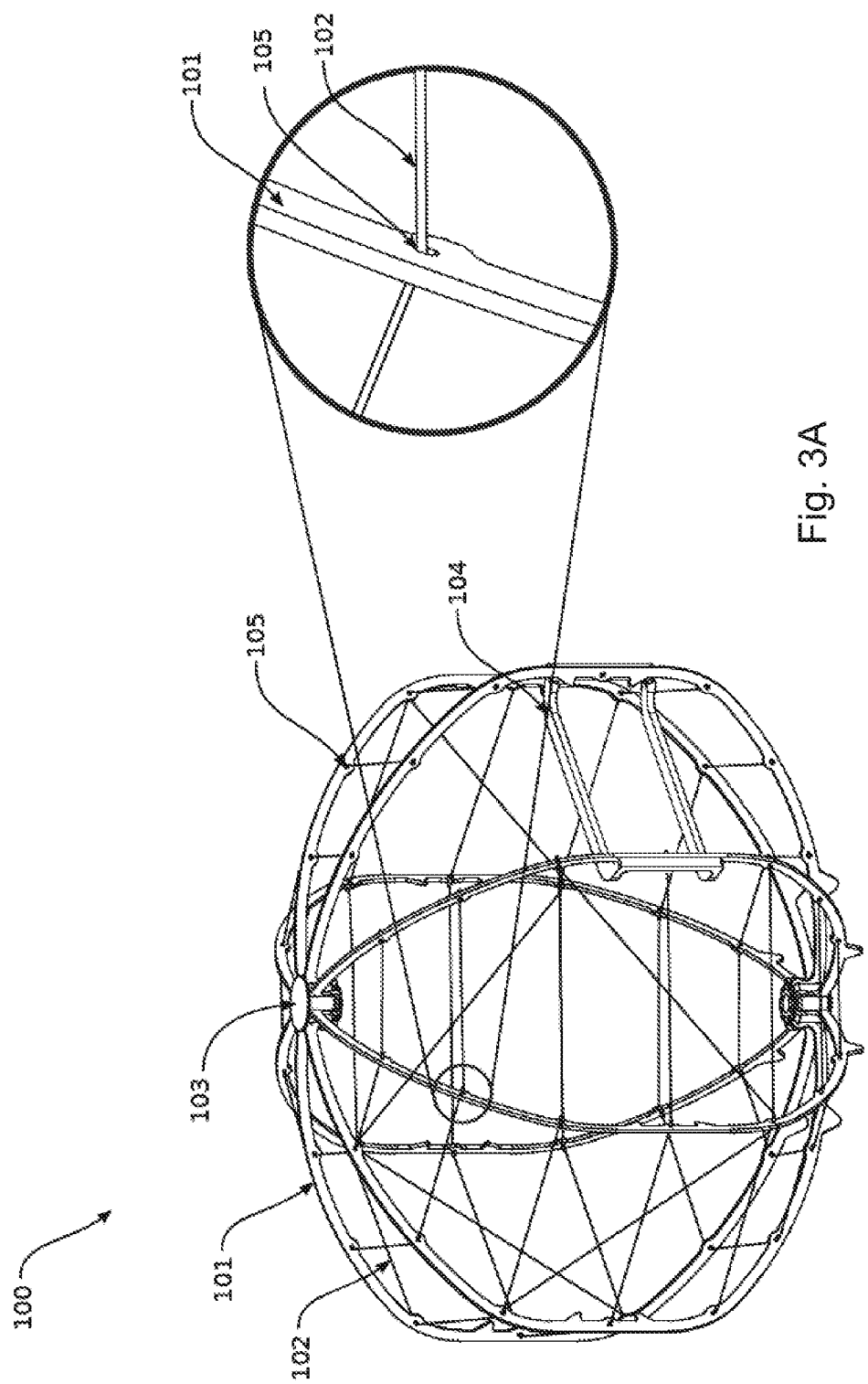

FIG. 3A: representation of a detail related to the rope anchor point.

Figure 4:
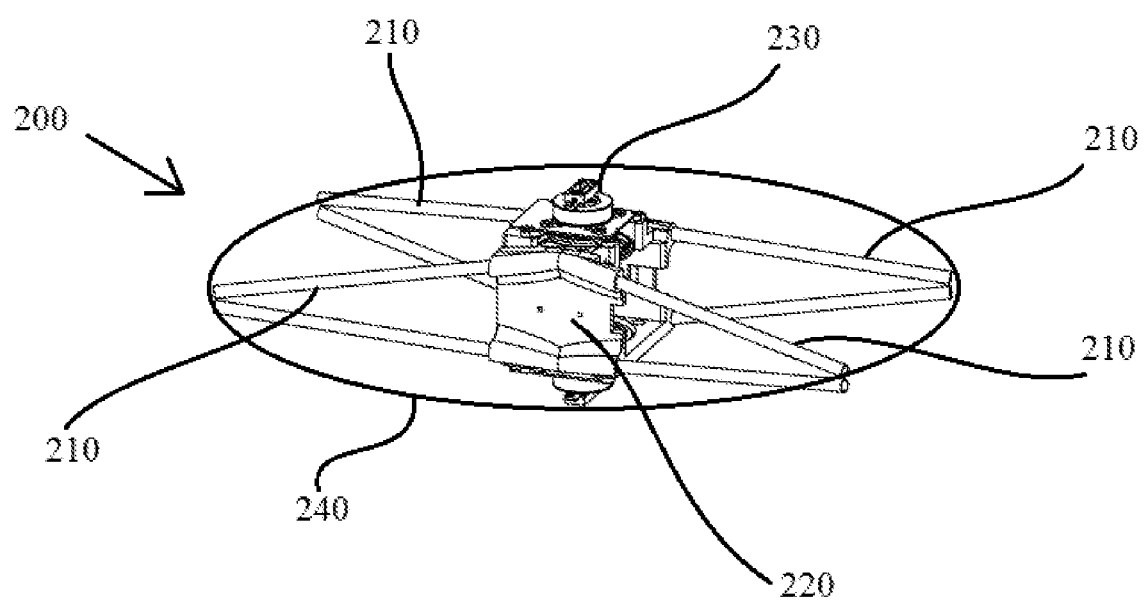
Figure 5:
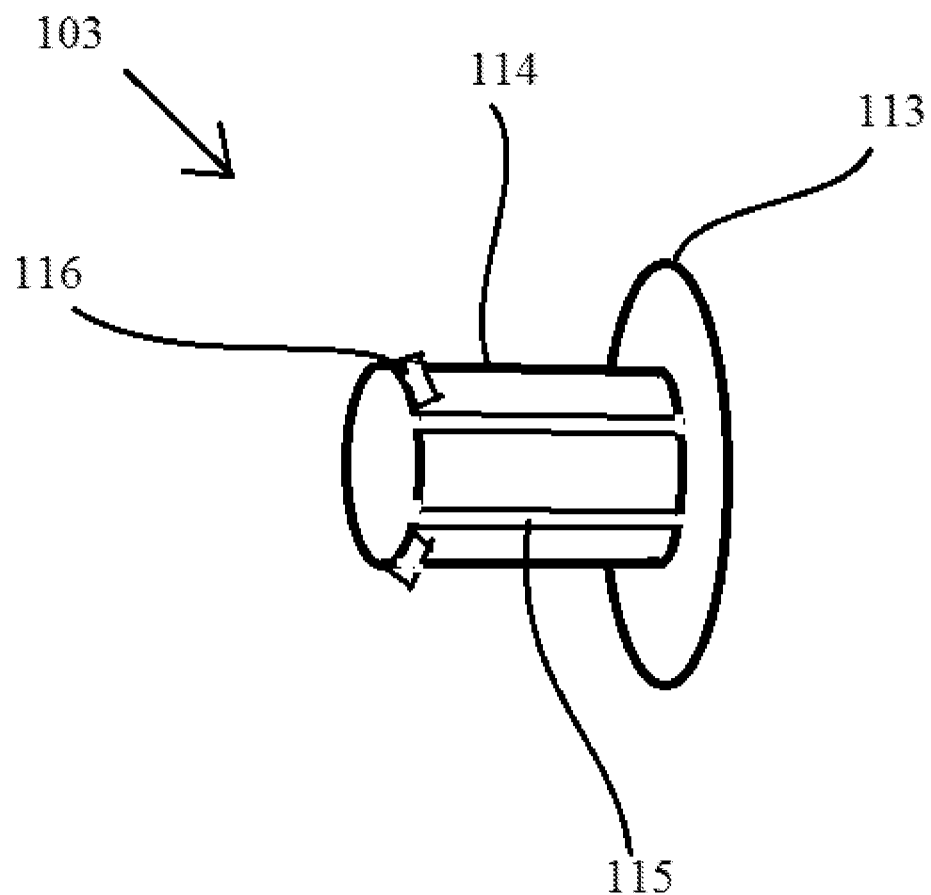

FIG. 4: example of a drone support according to the present disclosure,

FIG. 5: example of an indexing cap according to the present disclosure.

EXAMPLES OF EMBODIMENTS OF THE PRESENT INVENTION

With reference to FIGS. 1a, 1b and 1c, the protective cage 100 according to the present disclosure comprises several ribs 101 having a general curved or arcuate shape. Once deployed, the ribs 101 of the protective cage 100 define an internal space wherein a drone 106 can be arranged, as better shown in FIG. 1A. The ribs 101 are combined together at their extremities 141a, 141b, by means of a corresponding ring 106a, 106b. To this end a ring connection point 151a, 151b is arranged at both extremities of each of the ribs 101 wherein the ring is inserted. FIG. 1C shows an example of such an arrangement. The ring connection points 151a, 151b are through holes. In this specific arrangement, the rings 106a, 106b are not removable from the corresponding extremities 141a, 141b of the ribs 101. The rings 106a, 106b are however free to slide in the through holes of the rib extremities 141a, 141b so as to allow their folding and deployment moves. One of the rib extremities 141a, 141b, or both of them may however comprise a removable attachment point such as a snap hook, a spring hook, or other equivalent fast and safe removable fixation means. In this case, a rib 101 may be removed from the corresponding ring 106a, 106b. This facilitates its replacement in case of damages, or if the shape or size of some ribs 101 should be changed and better adapted to the drone 106.

The ribs 101 preferably adopt an arcuate shape so that their extremities 141a, 141b are facing each other. The concave side is here considered as the inward or inside part of the ribs, the convex side is here considered as the outward or outside part of the ribs. The ribs 101 define a virtual axis around which they can rotate to move from a folded position to a deployed position. In other words, the two opposites rings 106a, 106b also define such a virtual axis. Such an axis has a vertical orientation, meaning that, when the flying drone is in use and normally oriented, surrounded by the protective cage, the virtual axis passing by the extremities 141a, 141b of the ribs 101 is vertical, or substantially vertical. It is also parallel to the rotation axis of the rotors of the flying drone 106.

The ribs 101 are substantially flat, with a low thickness, so as to limit the hindrance once all the ribs 101 are folded one against each other. They may have a width higher than their thickness. The width of the ribs 101 determines the resistance of the ribs 101 in case of collisions against an obstacle. Depending on the needs, the thickness of the ribs 101 may be comprised between around 0.5 mm and around 5 mm. The width may be comprised between around 2 mm and around 20 mm. The proper width of the ribs 101 may be determined according to the number of ribs 101 of the cage 100, the speed of the drone, the weight of the ensemble comprising the drone, the cage, and the payload of the drone, the resistance of the material of the ribs 101 and any other suitable parameters. The thickness of the ribs 101 is preferably homogenous along their length from one of their extremities 141a to the opposite one 141b. Also, the ribs 101 have a linear thickness. Then, they can be stacked in a compact and flat arrangement once folded. The width of the ribs 101 may be non-homogenous along their length. For example, the width of the ribs 101 may be larger at their central portion compared to their peripheral portion. Alternatively or in addition, the ribs 101 may have a given geometry, which is for instance adapted to allow fixing additional elements or accessories. The damping of the chocs is thus efficient thanks to the larger width at the central portion of the ribs 101, while the weight remains light due to a decreased width at the peripheral portions of the ribs 101.

All the ribs 101 are preferably identical, meaning that their shape and size are identical. In that case, they form a symmetrical space. Alternatively, some ribs 101 may have a different shape. For example, ribs which are close to the rotors of the drone 106 may have an adapted shape protecting the rotors. In case a payload should be delivered, the shape of the ribs 101 may also be adapted according to the volume and position of the payload. In that case, the thickness may still remain the same for all the ribs 101 so that they can be compacted in a folded stage.

The ribs 101 are preferably flexible and tough, so as to resist the chocs in case of collisions. They are thus preferably made in a reinforced plastic polymer, such as a thermoplastic polymer, adapted to resist the energy of a choc and preserve the drone 106 from any damages. Other suitable damping materials may be used. For lightness and resistance, the ribs may also be made of, or comprise, carbon fibres or other inorganic fibres, or composite materials.

Along their length, the ribs 101 comprise string connection points 111a, 111b, 111c, 111d, 111e, 111f, adapted to insert a string 102. The string connection points of the ribs 101 are preferably facing each other so that all the corresponding string connection points are arranged in a same plane. Such a plane may be orthogonal to the virtual axis above-mentioned, passing to the opposite rings 106a, 106b. Depending on the needs, 1 to more than 10 series of string connection points can be provided, for instance, 2 to 4 or 3 to 6 series of connection strings, forming the same number of parallel planes. For example, FIGS. 1A, 1B and 1C show 8 series of string connection points 111a, 111b, 111c, 111d, 111e, 111f. In case the space between 2 parallel strings should be reduced, more series of string connection points may be arranged. A string connection point may denote a through hole. In that case, a given string 102 is preferably inserted into the through holes of a given series of contiguous ribs 101, meaning that it follows a given plane, once the ribs 101 are deployed. It is however not excluded that a string 102 passes through holes of contiguous ribs 101, which do not belong to the same plane. It is also not excluded that two strings 102 cross each other between two contiguous ribs 101. Preferably, one through hole of the ribs receive only one string 102. It may however be envisaged that two strings 102 pass through a given hole of the ribs 101 and cross therein to reach holes of other planes at contiguous ribs 101. Whether the strings 102 are arranged parallel to each other or not, it is understood that they join all the ribs 101 and provide a protective field between the ribs 101. The strings 102 thus also denote a rope mesh.

For an improved adaptability of the protective cage, as well as for lighten the protective cage 100, a large number of through holes may be provided on each rib 101. Such a large number may be for example comprised between 10 and 50 or more. The weight of the protective cage 100 is then lower, while the resistance against chocs is not impaired or not significantly impaired. In addition, the user can select the series of through holes where the strings 102 are inserted, depending on the specific needs. For example, only few strings 102 may pass through the holes 111, letting most of them unused. On the contrary, when a very dense protection appears necessary, all the through holes of the ribs may be crossed by a string 102.

The strings 102 joining the ribs 101 are preferably non elastic, or with a reduced elasticity, so as to rigidify the cage. When the cage 100 is fully deployed, the strings 102 are straight and no longer loose. Alternatively, the string may exhibit enough elasticity to be extended and to guarantee that it takes a straight position between the ribs 101 when they are fully deployed and locked in the deployed position by the means of the closing part 104, which will be better described below.

According to an embodiment, the strings 102 are fixed only to the first and the last rib 101 and free to slide through the holes 111a, 111b, 111c, 111d, 111e, 111f of the ribs 101 which are between the first and the last ribs. In that case, the first and the last ribs 101, once fully deployed, put the strings 102 in tension while allowing the ribs in between to have nonspecific relative angular positions. The angular position of the ribs in between may be determined by means of an indexing cap 103 at the extremities 141a, 141b of the ribs 101. Such an indexing caps 103 will be better described below.

According to another embodiment, the strings 102 are clamped at each through hole 111 of the ribs 101. The clamping may be performed by means of an adequate clamping means (not shown) allowing to removably trap the strings 102 against the corresponding ribs 101. Such clamping means may comprise a lever which can be actuated by the user to clamp and release the strings 102. Using such a removable means, the relative angular position of the ribs 101 may be easily adapted. For example, some ribs may need to be closely arranged while more space is allowed between other ribs. Such special arrangement may depend for instance on the drone itself, the number, the position and size of its rotors, or any other parameters.

Alternatively, the strings 102 are definitely clamped or fixed on the ribs 101. They may be glued or welded on the ribs 101. In that case, the relative angular position of the ribs 101, at the deployed position, is predetermined and cannot be easily modified. In that case, although it is preferable that the strings 102 cross the ribs 101 for a better resistance, it is understood that the through holes of the ribs 101 may be absent and the strings 102 are simply fixed on the surface of each rib 101.

The through holes 111a, 111b, 111c, 111d, 111e, 111f of the ribs 101, as defined above, necessitate to slide the strings 102 from one rib 101 to the adjacent one, from the first one until the last one. According to an alternative, the string connection points 111a, 111b, 111c, 111d, 111e, 111f of the ribs 101 may be removable or releasable attachment points such as a snap hooks, spring hooks, or other equivalent fast and safe removable fixation means. According to such a configuration, the strings 102 can easily be clipped within the hook, and optionally clamped. As for the corresponding ring connection points of the extremities 141a, 141b of the ribs 101, such arrangement allows an easy replacement of a rib if needed. In that case, the ribs to be exchanged may be removed from the rest of the protective cage 100 by merely disconnecting the strings 102 and the two opposite rings 106a, 106b, without removing all the strings 102 from all the ribs 101.

The number of ribs 101 may vary according to the needs. Four ribs 101 may be enough, for example in case of a helicopter having only one rotor at a central position. Otherwise, 6, 8, or more than 10 ribs 101 may be necessary. The ribs 101 may have a regular angular shift, providing a symmetrical arrangement. Alternatively, the relative angular position of the ribs 101 may be non-regular. This can be advantageous to concentrate the ribs at the most sensitive positions round the drones, while limiting the global weight and avoiding unnecessary ribs at other positions.

Some or all the ribs 101 may be provided with a lug 131 at a position close to their extremities. A position close to the extremity of the ribs means for example at a distance from the extremity lower than ⅕, ⅒ or 1/20 of the rib length depending on the needs or the shape of the ribs. Such a lug 131 allows to stabilise the cage 100 once landed on floor. The lug 131 is thus preferably arranged close to one extremity 141b, of the ribs 101, predetermined to be at a lower position when the drone lands. It is however not excluded that two lugs 131 are arranged symmetrically close to both extremities 141a, 141b of the ribs 101 so that no mistake is done when placing the ribs 101 on the rings 106a, 106b. It is understood that such lug 131 is oriented outward the corresponding rib 101 compared to the internal space the rib defines.

Some or all the ribs 101 comprise at least one attachment point 121a, adapted to removably connect the protective cage 100 to a flying drone 106. Depending on the case, the ribs may be directly linked to the drone 106 by means of this at least one attachment point 121a or linked to the drone through an intermediate support 200. It is noted that this attachment point allows to easily disconnect and connect the protective cage 100 to a drone 106. They are thus accessible by the user from outside the protective cage 100.

In an embodiment a support 200, comprising a support body 220 and a fixation means 230 adapted to receive a drone 106, also comprises support arms 210, the extremity of which can be connected to some ribs 101 at the corresponding attachment point 121a. To this end, the angular orientation of the support arms 210 can be adapted to coincide with one of the attachments point 121a of the ribs 101. Alternatively, the angular position of the ribs 101 may be easily adapted to coincide with the support arms 210. For example, the attachment point 121a, may comprise a recess in the width of the corresponding ribs 101 to receive the corresponding support arm 210. In addition, a clamping means may be provided, allowing the user to firmly connect the support 200 to the protective cage 100. Alternatively or in addition, the extremity of the support arms 210 may be provided with a ring surrounding the ribs to which the support arm 210 is attached. Such a ring can easily be opened and closed from outside the protective cage 100 by the user.

According to another embodiment, the at least one attachment point 121a comprises a lug having a flat surface and oriented inward the space defined by the protective cage 100. The support 200 comprises a support connection means 240, the dimensions of which correspond to the dimensions of the internal space defined by the protective cage 100 at the attachment point 121a, once the ribs are deployed. The support connection means 240 may be placed on the flat surface of the lug 121a of the ribs 101. When moving the ribs 101 from their folded position to the deployed position around the support connection means 240, their attachment point 121a slide along the support connection means 240 so as to immobilise it within the protective cage 100. According to this arrangement, no additional clamping means are necessary. The support connection means 240 has a circular geometry allowing such a sliding of the ribs during their deployment or folding moves. It can take the form of a circular rail linked or integral to the arms 210 of the support 200. An additional lug 121b is preferably provided, facing the previous lug 121a, having also a flat surface facing the flat surface of the first lug 121a. The space between the two lugs 121a, 121b corresponds to the thickness of the support connection means 240 and are adapted to slide around it. Once the cage is deployed, the two opposite lugs 121a, 121b clamp the support connection means 240 and immobilise the support within the internal space of the cage 100. It is understood that the two opposite lugs 121a, 121b can be replaced by a recess in the width of the ribs, adapted to surround the support connection means 240.

The attachment points 121a, 121b, may define one predetermined emplacement for the support 200 of the drone 106 in the internal space of the cage 100. Additional attachments points 121a, 121b may be distributed along the ribs 101 to allow positioning a support 200 at various height in the internal space of the cage 100. For example, some attachment points may be provided at the middle of the ribs 101, so that the support 200 is positioned at a central position in the internal space of the cage 100. Attachments points may be provided at higher positions such as ⅔ or ¾ of the height of the cage 100 so as to arrange enough space for the payload below the drone 106. Attachment points may be provided below the middle of the ribs 101 such as ⅓ or ¼ of the height of the cage 100. The gravity centre of the ensemble can thus be adapted for a better flyability.

A support 200 is preferably used to connect a flying drone 106 to the protective cage 100. Such a support 200 comprises support arms 210 or any suitable link adapted to join the attachment points of the ribs 101, either directly or by means of a support connection means 240. The length of the support arm 210 may be tune so as to be easily adapted to the dimensions of the cage 100 at the selected attachment points. For example, they may be telescopic or comprise several segments which can be added to each other to determine their length. Depending of the needs, the support arms 210 may be flexible to be able to damp some choc in a vertical direction. For example, when landing or when elevating inside a closed space such as a warehouse, collisions from the floor or the top of a building may be damped thanks to the flexibility of the arms 210. Alternatively, the support arms 210 are reinforced so as to prevent any flexibility.

The support arms 210 originate from a support body 220, normally at a central position. The support arms 210 may be rigidly fixed to the support body 220. Alternatively, they can be articulated, for example by means of a hinge, so as to be able to rotate and adapt their relative angular position. The support body comprises a fixation mean 230 adapted to immobilise the drone 106. Such a fixation means 230 may be universal and usable for any type of drones 106. Alternatively, the fixation means 230 can be specific to some drones 106. The fixation means 230 may be replaced by a different model, when necessary.

The support body 220 may be adapted to store some payload or to receive a pocket or bag which can be suspended on it.

The cage 100 here described may further comprise one or two caps 103, which can be inserted in the rings 106a, 106b positioned at the extremities 141a, 141b of the ribs 101. The cap 103 can comprise a head 113 and a cap body 114, fixed to the head 113. The cap body 114 may have a global cylindrical shape the dimensions of which are adapted to be inserted into the rings 106a, 106b positioned at the extremities 141a, 141b of the ribs 101. The head has dimensions, in particular a diameter, larger than the cap body 114 and cannot pass through the rings 106a, 106b. The cap body is advantageously provided with flexible and elastic tabs 116 at its end opposite the head 113. Alternatively or in addition, the cap body 114 may comprise flexible and elastic sections allowing to clip the cap 103 in the rings 106a, 106b. Thus, once the ribs 101 of the protective cage 100 are deployed, the cap 103 can be clipped ate the extremities of the ribs 101. In case, the extremities of the ribs 101 is provided with a releasable fixation such as a snap hook, a spring hook or any equivalent means, the cap body allows to secure the ribs 101 on the rings 106a, 106b by avoiding an accidental opening of such fast fixation means. In addition, the cap 103 may comprise indexing means allowing to maintain the ribs 101 at predetermined angular positions, once deployed. Such indexing means may be for example slots 115 provided in the cap body 114 and adapted to receive the thickness of the extremities 141a, 141b of the ribs 101. The slots 115 are arranged as parallel indexing means, at predetermined angular positions on the cap body 114. Alternatively or in addition, the head 113 may be provided with slots radially oriented and adapted to receive the thickness of the extremities 141a, 141b of the ribs 101 at predetermined angular positions. Such an arrangement may be used when the ribs 101 between the first rib and the last rib are free to move and slide along the strings 102. In that case, their angular position can be determined with the caps 103 placed at each extremity. Even in case all the ribs have already a fixed angular position, the caps 103 reinforces the strength of the cage 100.

The indexing means of the caps 103 further allow to lock the ribs 101 at predetermined angular positions, in addition to or in replacement of the closing part 104. It is noted that the angular position of the indices of the cap 103 can be homogenous and regular. Alternatively, non-homogenous angular positions may be arranged, as above-mentioned. Depending on the needs, different caps 103, having various angular distribution of the indices, can easily be used. It is here highlighted that the cap 103 is merely clipped on the cage 100 and that it does not need screwing step or additional locking or clamping steps. This provides an easy and fast means to maintain the ribs 101 at their relative angular position and/or lock the cage 100 at its deployed position.

The protective cage 100 of the present disclosure further comprises a closing part 104. Such closing means allows to fil the space between the first 101a and the last 101b rib 101 once the cage 100 is deployed. It is here mentioned that the strings 102 joining and crossing the ribs 101 have a length corresponding to the circular distance along all the ribs 101 when the cage 100 is deployed, said distance depending on the position of the corresponding string along the ribs. The space remaining between the first 101a and the last 101b ribs is thus not filed with the strings 102. The closing part 104 comprises to this end one or several rods 104a, 104b allowing to join the first 101a and the last 101b ribs, so as to maintain them at the deployed position. Such rods 104a, 104b have the adequate length, corresponding to their position along the ribs 101. According to an embodiment, the closing part 104 is fixed to one of the first 101a and the last 101b ribs and can be removably connected to the other one of the first 101a and the last 101b ribs. For example, the rod or the rods 104a, 104b constituting the closing part 104 can be hinged 104c on one of the first 101a and last 101b ribs. The other extremity of the rod or rods 104a, 104b of the closing part 104 may comprise a hook 104d adapted to be latched on the other one of the first 101a and last 101b ribs. Enough flexibility and elasticity may be required to provide tension of the strings 102, once the cage is deployed and the closing part is closed. A mere pressure on the closing part 104 allows to lock the cage at its deployed stage.

According to another arrangement the rod or rods of the closing part 104 can be removed from both the first 101a and the last 101b ribs. To this extent, they comprise a hook 104d at both extremities which can be affixed to the first 101a and the last 101b ribs to maintain the proper tension to the strings 102.

The present disclosure also relates to a method of protecting a flying drone by means of the foldable protection cage 100 here described. The method comprises a step of deploying the ribs 101 around a virtual rotation axis passing by their extremities 141a, 141b so as to surround a drone 106. Preferably, the step of deploying the ribs around the drone also allows, concomitantly, to position the drone and/or its support 200, in the internal space defined by the ribs once deployed. A separate step of fixing the drone and/or its support 200 to the protective cage 100 can thus be avoided.

The method comprises a step of locking the cage 100 at its deployed position, by means of a closing part 104. Such a closing part maintains at least the relative angular position of the first and last ribs 101. Where applicable, the other ribs, between the first and the last one, may still be free to move.

The method may comprise a further step of clipping one or two caps 103 at the extremities 141a, 141b of the ribs, once deployed. It is highlighted that when the caps 103 comprise indexing means, allowing to maintain the ribs 101 at their relative angular position, this step may replace the above step of locking the cage at its deployed position by means of closing part 104. Only one of the indexing cap and the closing part may thus be used. Preferably, both are used, further considering that no screwing or additional manipulations are required but just clipping the adequate cap and/or closing part.

The method may further comprise replacing one or several ribs 101, independently of the other ones of the cage. This may be required after a collision to replace a damaged rib. This may also be advantageous for modulating the shape and size of the cage.

For all the disclosure, unless otherwise stated, the terms "vertical", "horizontal", and related terms, where employed, have the usual meaning, and correspond to the standard use of the described cage.

The terms "flying drone" denote any unmanned aerial vehicle, either running under autonomy or remotely piloted by a user. This is without limitation regarding the type and dimensions of the aerial vehicle, neither its use. It can be a surveillance vehicle, a vehicle dedicated to deliver payload, either indoor or outside, or any other vehicle.

The terms "string" and "rope" are equivalent for the purpose of the present disclosure. One skilled in the art understands that any related flexible link would be equally suitable.

REFERENCE SYMBOLS IN THE FIGURES

100 Protective cage
101 Ribs
101a First rib
101b Last rib
102 Rope mesh string
103, 103a, 103b Cap
104 Closing part
104a, 104b Rods of the closing part
104c Hinge of the closing part
104d Hook of the closing part
105 Nodes
106 Drone
106a, 106b Rings
111a, b, c, d, e String connection points
113 Cap head
114 Cap body
116 Cap tabs
115 Slots
121a, 121b Attachment points
141a, 141b Rib extremities
151a, 151b Rib connection point
200 Support
210 Support arms
220 Support body
230 Fixation means
240 Support connection means

The invention claimed is:

1. A protective cage comprising
a plurality of ribs having an arcuate shape, each of the ribs being provided with a ring connection point at both extremities, and comprising several string connection points along their length,
a ring passing through said ring connection point of each of said extremities and allowing a relative angular position of the ribs of said plurality of ribs from a folded position to a deployed position,
at least one string passing through said string connection points of adjacent ribs from a first until a last rib of said plurality of ribs, wherein the length of said at least one string corresponds to the maximal relative angular position of the first and the last ribs,
further comprising at least one locking means selected among a cap and a closing part adapted to maintain the ribs at predetermined relative angular positions, once fully deployed, wherein the cap comprises a head and a cap body adapted to be removably inserted in said rings and wherein said closing part comprises one or more rods hinged on one of the first and last ribs having at least one hook, adapted to removably and directly connect the first and the last ribs at their maximal relative angular position, while maintaining said at least one string under tension.

2. The protective cage according to claim 1, wherein said at least one string is fixed to the first and the last ribs of said plurality of ribs, and remains free to slide through said string connection points of said ribs.

3. The protective cage according to claim 1, wherein said at least one string is fixed at all the ribs of said plurality of ribs, so that said plurality of ribs remains at a predetermined relative angular position when said at least one string is straight.

4. The protective cage according to claim 1, wherein all said ribs have a flat and homogenous thickness.

5. The protective cage according to claim 1, wherein said ribs have a width larger than their thickness.

6. The protective cage according to claim 1, wherein some or all of the ribs comprises at least one lug positioned outward their arcuate shape and close to one of their extremities.

7. The protective cage according to claim 1, wherein some or all of the said ribs comprises at least one attachment point adapted to receive a flying drone or a flying drone support.

8. The protective cage according to claim 7, wherein said attachment point comprising a first lug and a second lug, each one comprising a flat surface facing each other and positioned inside the arcuate shape of said ribs.

9. The protective cage according to claim 1, wherein said cap comprises indices adapted to maintain the ribs at a predetermined relative angular position.

10. The protective cage according to claim 1, wherein said ring connection point and said string connection points independently denote through holes, snap hook, spring hook, or other equivalent fast and safe releasable fixation means.

11. A system comprising a protective cage according to claim 1, and a support comprising a support body having some arms and a fixation means adapted to fix a flying drone, said support arms being connectable to some ribs of said plurality of ribs at a corresponding attachment point.

12. The system according to claim 11, said support further comprising a support connection means linked or integral with the ends of the arms and adapted to engage with said attachment point when the ribs are rotated from a folded position to the deployed position.

13. The system according to claim 11, wherein the length of said arms can be adapted to the dimensions of the internal space defined by the ribs once deployed.

14. A method of protecting a flying drone comprising the steps of
deploying a protective cage as described in claim 1 around a drone support,
locking the cage at its deployed position by clipping a cap at both rings or closing the closing part or both, so as to maintain the ribs at a predetermined relative angular position.

15. The method according to claim 14, further comprising the steps of removing or replacing one or more ribs without dissociating the other ribs from the rings and from the at least one string.

* * * * *